Sept. 13, 1949.  J. A. BRADNER  2,481,974
MACHINE FOR HOBBING GEARS
Filed May 21, 1946  5 Sheets-Sheet 1

Fig-1

John A. Bradner,
Inventor
By Frank M. Slough,
His Attorney.

Sept. 13, 1949.  J. A. BRADNER  2,481,974
MACHINE FOR HOBBING GEARS
Filed May 21, 1946  5 Sheets-Sheet 4

Fig-3a

Inventor,
John A. Bradner
By Frank M. Slough
His Attorney

FIG. 4

Patented Sept. 13, 1949

2,481,974

UNITED STATES PATENT OFFICE 2,481,974

MACHINE FOR HOBBING GEARS

John A. Bradner, Cleveland, Ohio, assignor to The Lees-Bradner Company, Cleveland, Ohio, a corporation of Ohio Application May 21, 1946, Serial No. 671,290

14 Claims. (Cl. 90—4)

My invention relates to improvements in a machine for hobbing gears and relates more particularly to improved means for adjusting the axial position of a gear hob periodically, to compensate for wear of the cutting edges of the hob teeth. Gear hobs have previously been adjusted from time to time to displace the hob in the axial direction of a small amount, depending upon the pitch of the helically disposed hob teeth, whereby one of the next succeeding teeth of the helically disposed teeth is so displaced axially of the hob as to present its cutting edges in the plane transverse to the hob axis wherein the cutting edges of the preceding tooth had been located.

It is highly desirable that such axial readjustment of the hob shall be effected prior to the time that the cutting edges of the preceding tooth shall have been worn to a substantial extent, in order that the wear shall be substantially equally distributed among a relatively large number of the hob teeth.

Prior attempts to effect a continuous axial readjustment movement of a hob during cutting of spur gears have been unsuccessful, largely for the reason that during certain portions of such continuous axial movement there has not been proper alignment of the cutting edge of certain of the hob teeth, which at the time are presented to the gear blank for forming the teeth thereof, with respect to the concurrent rotative position of said blank, and therefore the resulting gear teeth are not properly formed.

Also, prior to my present invention, means for manually longitudinally adjusting the hob spindle, at intervals, to compensate for the aforesaid wear, have been employed, a typical arrangement involving a rotatable adjustment element, which is interthreaded with a relatively axially aligned element of the hob spindle, and having a jam nut or jam bolt to normally secure the aforesaid inter-threaded elements against relative rotation, wherein the jam element must first be manually loosened in order to permit manually effected relative rotation of the aforesaid inter-threaded elements, and then be manually retightened to prevent further relative rotating movement of said relatively telescoped elements.

Inasmuch as the above manually effected adjustment operation involves the attention of an operator over many periods, and the amount of work being done by the hob also varies considerably over different periods, it frequently happens that the adjustment operations are not uniformly performed at the right times, and after periods during which the tooth wear has progressed to the same degree.

Objects of my present invention are as follows:

To provide automatically operable power actuated means adapted to periodically effect the same degree of longitudinal adjustment of the hob, with each adjustment of said hob, succeeding a like period of work done by the hob.

To achieve the foregoing object in a simple, expeditious manner, through the instrumentality of adjustment mechanism which is not unduly expensive, and which will be highly reliable in use.

To provide an improved hob adjustment mechanism susceptible to being operated by a single rotative movement of an adjustment element, said movement being contiguous and unidirectional and comprising a preliminary operation for loosening a jam element and a subsequent operation to effect the desired degree of longitudinal adjustment movement of the hob.

Other objects of the invention, and the invention itself, will be apparent to those skilled in the art to which my invention appertains, by reference to the accompanying description of the preferred embodiment of my invention, wherein reference is made to the accompanying drawings whereof.

Referring now to the drawings, in all of which like parts are designated by like reference characters, the hob spindle 1, which affords an arbor 20 for carrying the hob 100, is supported at a forward end in a sliding block 21, slidable at 22 in slideways 23, which are provided by a portion of the frame 25, which supports the outer or forward end of the hob spindle, the spindle being journaled for rotation in said block, and its rear end 1a being journaled for axial sliding movement within a longitudinally fixed sleeve 29, to which it is relatively non-rotatably interlocked by a key 41.

The slide 21 and spindle 1 are adapted for sliding reciprocation in both forward and rearward directions. The hob is fixedly clamped onto the spindle and is prevented from any rotational movement independently of the spindle, by a key 26.

The spindle extends rearwardly from the arbor 20 by a shank portion which terminates rearwardly in an end 1a, which is provided with an internally threaded tubular recess 28. Also in a more forward portion of said recess the enlarged threaded head of a jam screw 8 is telescoped, and with said screw normally advanced slightly from a position of engagement of the rearmost surface of its head with the front end of the sleeve 15, the opposite longitudinally directed thrust effects by the threaded portions of the elements 8 and 15 cause the spindle and sleeve 15 to become relatively so interlocked as to prevent relative rotation. The interlocking occurs since the threads 8' and 15b are both engaged with the same internally threaded surface of the recess 28. The distance between said rear head surface and the shoulder 99 near the rear end of the shank of said jam screw is slightly greater than the length of the sleeve 15 to permit a slight amount of axial movement of said head relative to said sleeve.

Figure 3:
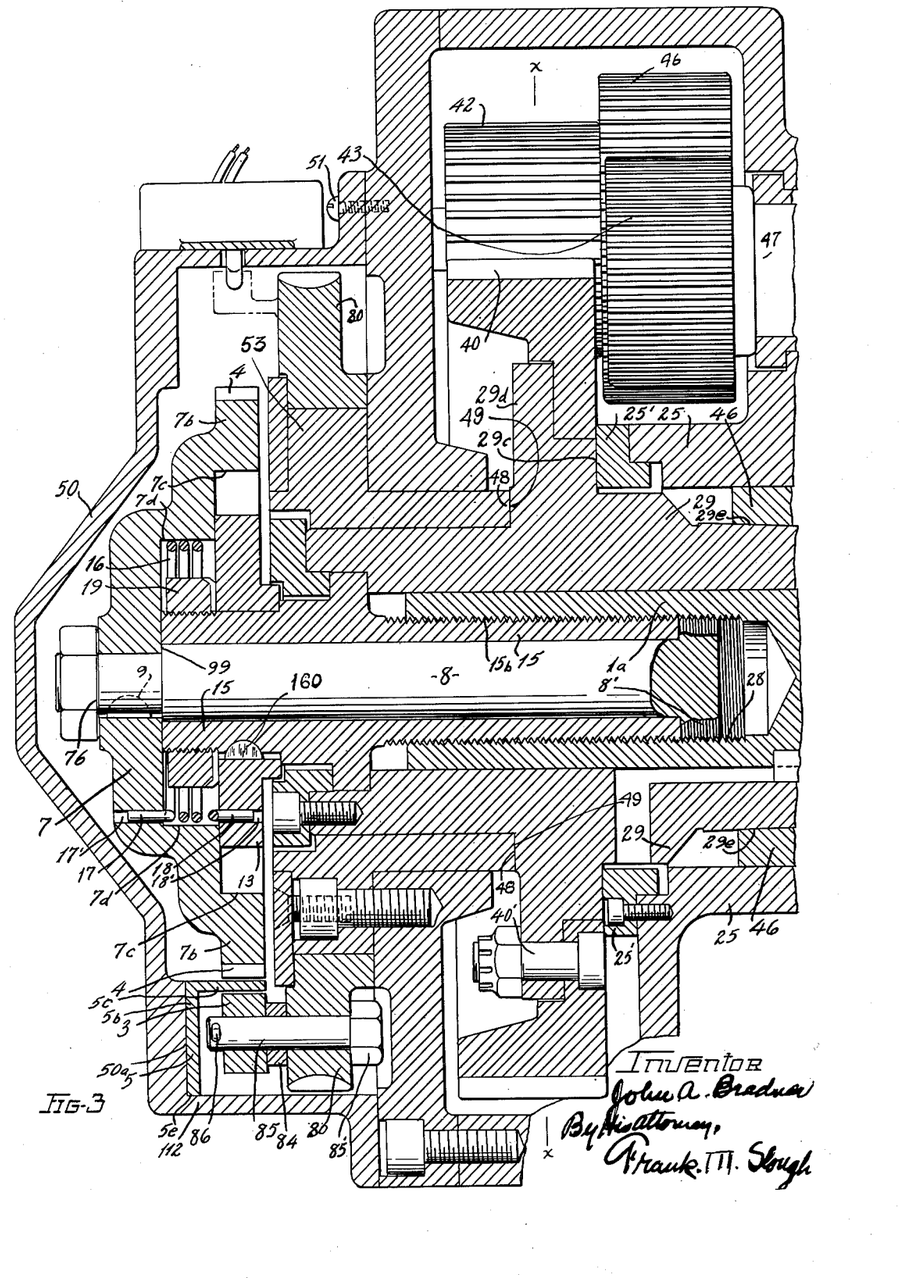
Fig. 3 is a sectional view taken on the line 3—3 of Fig. 2.

In the zone of the plane x—x, Fig. 3, a plurality of relatively telescoped parts are disposed in concentric relation, an outermost part being the drive gear 40 carried on a radial flange 29d of a sleeve 29, and within the sleeve 29 the rearward tubular portion 1a of the spindle 1 is telescoped, and within said tubular spindle portion an inner sleeve 15 is disposed, said inner sleeve 15 being provided with an exterior threaded portion 15b, which is meshed with interior threads of said cylindrical portion 1a.

Of the aforesaid relatively telescoped annular parts, the drive gear annulus 40 is peripherally supported on the flange 29d of the sleeve 29, being bolted thereto by a plurality of interspaced annularly disposed bolts 40'. The outer sleeve 29 is adapted to be rotatably driven by the gear 40, and being keyed by a key 41 to the intermediate spindle portion 1b, the drive gear 40 is enabled to rotationally drive the outer sleeve 29 and the spindle 1b, the latter carrying the hob arbor 20, which is therefore rotationally driven by the gear to rotate the hob.

At 42 a drive pinion, driven by gearing comprising elements 46, 43, 47 and 44, is meshed with gear 40, and the pinion 43 receives power communicated to said gearing by a beveled gear 45, from a motor associated with the hobbing machine, said motor being located exteriorly of the hob head frame 25, and not herein shown.

The gear 40 and outer sleeve 29 are prevented from moving longitudinally forward, by engagement of the lateral surface 29c of its radial flange 29d with an abutment bearing element 25', which is backed by an element of the head frame, and also by engagement of its tapered surface 29e with the cooperatively tapered bearing 46, which is fixed with respect to the main frame 25. The sleeve 29 is similarly prevented from shifting rearwardly by engagement of its rearwardly facing shoulder portion 49 with a forward edge portion 48, of the support 53, for the worm gear 80.

Within a cover-plate 50, Fig. 3, which is secured to the rear end of the enclosing housing 25 by a series of bolts 51, are placed a plurality of co-operatively related elements for carrying out the primary objectives of the present invention, such elements being actuatably responsive to activating energization of a reversible electric motor M, which is also carried by a flange 61', of said cover-plate.

The motor is provided with a shaft S, on the end 60 of which an exteriorly threaded worm pinion P is secured, said shaft end being journaled at 61, within an extension of said cover, the motor M also being rigidly secured upon said flange 61. The worm pinion P is peripherally meshed with the teeth of a worm gear 80 to effect rotation of the gear 80 in either direction by the reversible motor.

A generally cup-shaped ratchet wheel is disposed parallel to and externally adjacent to the gear 80, the ratchet teeth 4 being disposed on a peripheral flange 7b. The wheel is secured onto the end of the jam screw 8 and keyed thereto by a key 9, opposing surfaces of a nut 76, with a shoulder of the jam screw holding the central portion of the wheel 7 in place.

The interior of the cup-shaped wheel disc is successively stepped at 7c and 7d to provide an interior stepped recess. The final step 7d of said recess, together with the opposing outer surface of the end of the sleeve 15, defines a substantially annular recess within which an abutment nut 19, which is screw-threaded onto the sleeve end, and a spring coil 16, are successively radially outwardly disposed.

The two ends 17 and 18 of the spring coil are respectively anchored within apertures 17' and 18' of the wheel disc 7, and a vane 13 which is loosely journaled upon the sleeve 15 inwardly of the nut 19. Rotational movement of the vane 13 is restricted by the conformation of the opposing inner wall surfaces 7c of the wheel recess, which restrict the possible angular movement of the vane 13 to an angle which may be widely varied in practice, but which in the embodiment illustrated is about 25°.

The spring 16 affords a yieldable resilient motion communicating element interconnecting the wheel element 7 and the vane 13, and independently of the extent of rotational movement of the wheel the vane can never be swung from a normal position more than the predetermined angular throw of such vane, as determined by the inwardly facing walls 7c of the wheel recess which, in the present embodiment, amounts to an angle of 25°.

The means for rotationally driving the ratchet wheel 7 comprise a ratchet pawl 3, journaled upon a pin 85 having a head 85' and carrying a cotter-pin 86, said pin being projected laterally through an aperture of the worm gear 80 and retained in place by its head and said pin, a spacing washer 84 being telescoped over the shank of said pin 85 and interposed between the relatively confronting surfaces of said wheel and said pawl.

At 5 an arcuate shield element having a radial flange 5b and a lateral flange 5c, said flanges extending concentrically with the axis of rotation of the wheel 7, is disposed within the cover 50. The outer arcuate edge 5e of the radial flange is preferably disposed in abutting engagement with the inner surface of the tubular flange 112 of the cover, and the rearwardly facing surface of said radial flange being engaged flatwise against an inner planular arcuate surface 50a of the cover-plate.

The cover-plate 50 is provided with a plurality of suitably interspaced arcuate slots 105, and the radial shield flange 5b is provided with a plurality of small circular apertures 87'. The shield is clamped to the rear face of the cover-plate by a plurality of screws 87, each projected forwardly through a suitably disposed cover slot 105, and screw-threaded into suitable apertures 87', until the heads of said screws 87 effect clamping engagement with the rear face portions of the cover-plate, which adjoin the selected arcuate slots 105.

The pawl tooth 3', when the parts are at rest in normal inoperative position, is spring-pressed by the spring 6 against the radially outermost surface of the lateral flange 5c, which is adjustably carried on the inner surface 50' of the head cover 50.

The shield 5, being arcuately formed, is adjustably slidable on the cover surface in opposite directions to rotatively shift its position between limits determined by the length of the slots 105, when the screws 87 are slightly retracted by rotation of their heads, which are disposed at the rear face of the cover-plate 50.

By virtue of said slots and securing screws 87, the shield may be arcuately shifted to a preadjustment position to predetermine the operative extent of rotative movement of the gear 80 by motion communicated from said gear through said pawl 3 to the ratchet wheel 7, and the rotative position of the first of the ratchet teeth to be engaged by the pawl tooth 3'.

The purpose of providing for adjustment of the shield 5 is to predetermine the extent of rotative movement of the ratchet wheel 7, to predetermine the extent of axial adjustment movement of the spindle 1 during each operative operation of the motor M. This is accomplished by adjustably advancing or retracting the forward edge 5d of the lateral shield flange 5c, said portion being preferably wider than other portions of the same flange, whereby the point on the periphery of the ratchet wheel 7, to be initially engaged by the tooth 3' of the pawl 3 when said pawl is rotatively advanced in the counter-clockwise direction, is predetermined.

It will be understood that should it be desired to further advance the forward edge 5d of the pawl-shield flange 5c, that the shield may be arcuately moved forwardly in a counter-clockwise direction so as to align said slots with other equally spaced apertures 87 which preferably are disposed at equal intervals through the radial shield flange 5b.

As previously briefly stated, it is desired that periodic axial adjustment movement of the hob should longitudinally shift the hob a distance which will displace one of the next succeeding teeth so as to present its cutting edge in the same plane traverse to the hob axis wherein the cutting edges of a preceding tooth had been located.

Figure 3A:
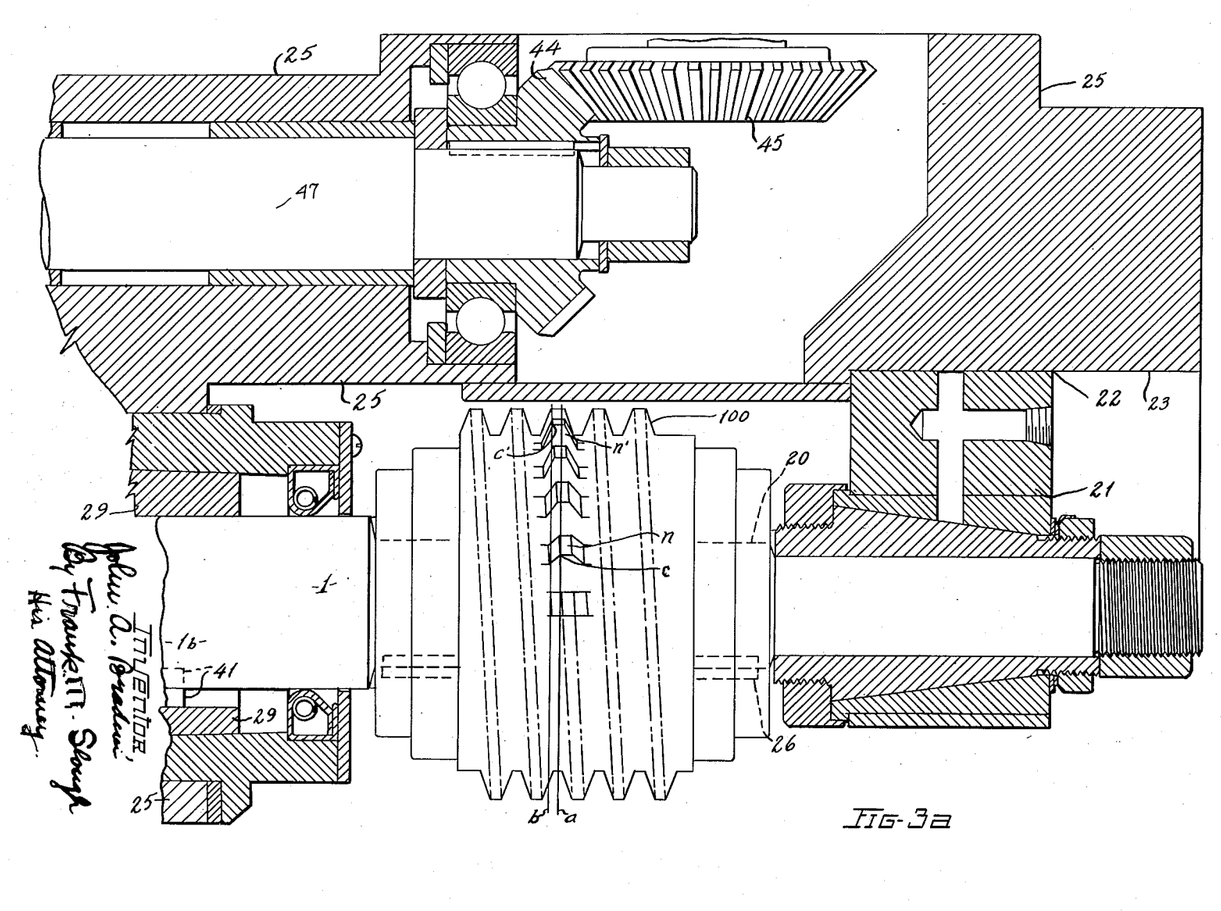
Fig. 3a is a continuation of Fig. 3, said section line being also indicated in Fig. 2.

In Fig. 3a the nature of longitudinal displacement of like cutting edge portions of successively trailing hob teeth is indicated by the relatively interspaced lines a—b, said lines indicating parallel planes, both disposed at right angles to the axis of the hob 100. The line a is shown as intersecting the outermost corner c of a tooth n, whereas the line b is shown as intersecting a similar corner c' of a tooth n', there being two other teeth disposed between said teeth n and n'. Although the showing is not intended to be to an accurate scale, it is supplied in order to indicate the necessity of longitudinal movement of the spindle 1 and the hob 100 in the forward direction D in order to dispose the cutting edge portion c' of the tooth n' in the transverse plane formerly occupied by the similar portion c of the tooth n. Such longitudinal movement may be of the order of .020 inch to .030 inch, more or less, depending upon the size of the gear tooth which the hob is adapted to form, and the pitch of relative disposition of said teeth.

The plane a, above mentioned may be taken as the plane where deepest blank cutting penetration of the hob had been taking place.

Inasmuch as the longitudinal adjustment movement of the hob is effected responsive to rotation of the sleeve 15, which is in screw-threaded engagement at 15b with the inner wall of the cylindrical rear end 1a of the hob spindle, the pitch of the threads 15b is another factor which enters into the determination of the rotative movement of the sleeve 15, in order to axially shift the hob the required amount, which is predetermined by the pitch of the helically disposed hob teeth.

The necessary rotative movement of the sleeve 15 is finally determined by a desire to substitute the cutting edges of a more rearwardly disposed hob tooth for the datum tooth, in the aforesaid transverse plane. In other words, instead of only providing such an amount of longitudinal adjustment movement for the hob as would position the cutting edges of the next succeeding hob tooth in a circumferential direction in the said datum plane, it may sometimes be desirable to substitute the second, third, fourth, or any other succeeding tooth to dispose its edges in said plane.

In any event, the axial adjustment movement required to be imposed upon the hob is that movement which is necessary to substitute the next succeeding tooth in the said plane, or alternately, any multiple of the amount of such adjustment movement may be employed, and is readily achieved by loosening the screws 87 at the rear face of the cover 50, and thrusting said screws, by their heads, in the appropriate arcuate direction of movement in said slots 105, to suitably adjustably advance or retract the forward edge of the shield flange 5c.

The hob shown on the arbor 20 of Fig. 3a is representative of a typical hob employed for cutting involute spur teeth having a 14½° pressure angle. However, as will be readily apparent, the present invention is not limited to hobs for cutting gear blanks to provide gear teeth having the aforesaid pressure angle, but may be applied to the adjustment of hobs for cutting gear teeth of widely variant forms, such as stub gear teeth having a pressure angle of 20°.

Figure 2:
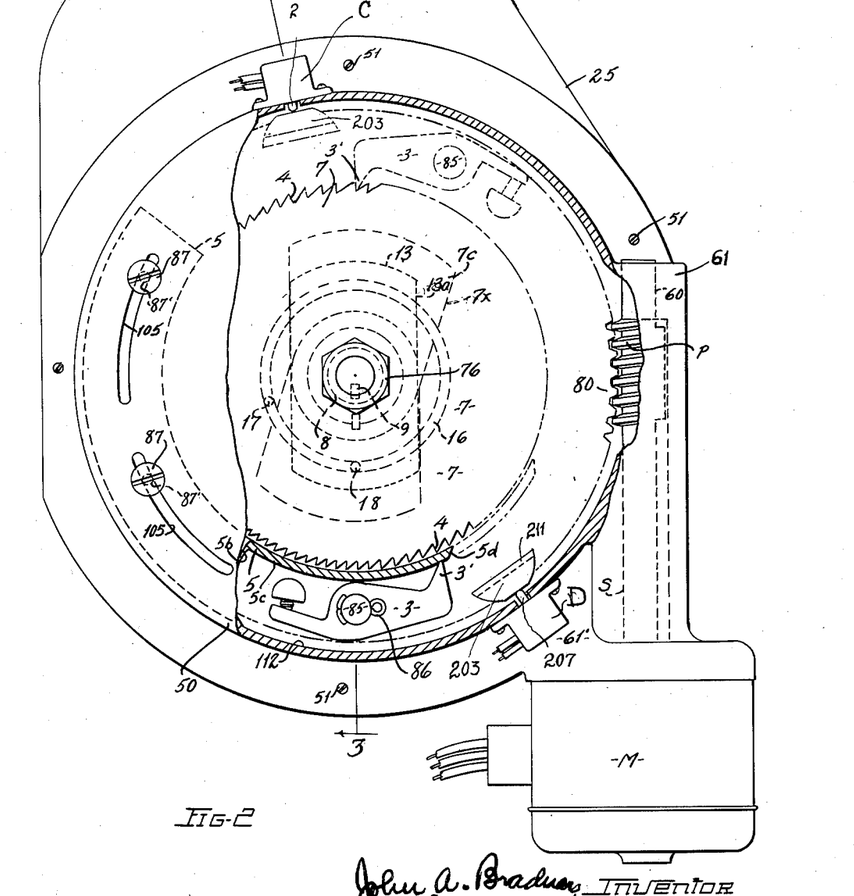
Fig. 2 is an end elevational view of the head illustrated in Fig. 1.
Figure 4:
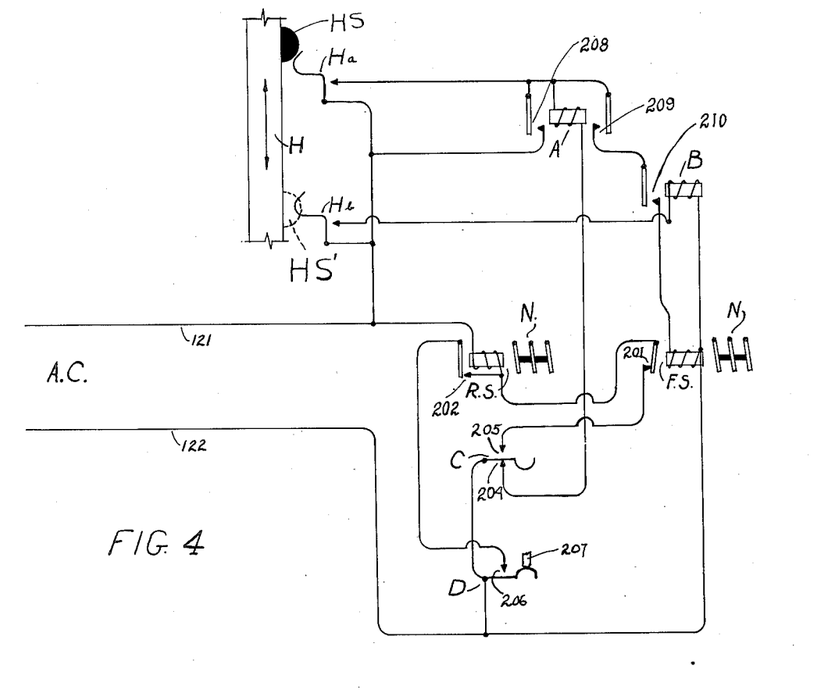
Fig. 4 is an electrical circuit diagram.

In Fig. 4, the electrical circuit and the controlling elements thereof which may be employed in order to effect starting of the motor M, subsequent reversal of rotation of said motor shaft, and stopping of the motor, are diagrammatically shown, and the primary elements thereof are a pair of relays A and B, the respective control switches Ha and Hb therefor, said relays and switches being employed to start the motor M, the above apparatus being associated with the hobbing machine and the starting and reverse relays FS and RS and control switches C and D which are associated with the mechanism of, and are shown in, Fig. 2.

It will be understood that preferably the apparatus of my present invention, which is operated responsive to energization of the motor M, will only be operated during the initial portion of each period wherein the hobbing machine, which is provided with the hobbing unit carried by the head frame 25, including the hob 100, is inoperative.

It is common practice to set such hobbing machines for successive interspaced operative hobbing periods, and at the end of each period during which completely cut gears are removed and new gear blanks are inserted, the said apparatus of my present invention becomes operative, and completes its cycle of operation during such an inoperative period of the hobbing machine.

The above electrical means and the circuit thereof being more fully hereinafter described, it may now be said that a cam extension 203 secured at 211 to, and carried by, the gear 80 being movable over a predetermined angle of movement which, in the present embodiment, is approximately 155°, is adapted to move counterclockwise from its illustrated solid line position of Fig. 2 to the indicated dotted line position of said cam. In the latter position, the cam engages an actuating plunger 2 of the switch C to reverse the direction of rotation of the motor to restore the gear and said cam to the initial rotative position whereat said cam engages a plunger 207 of the switch D to effect deenergization of the motor which was originally energized by virtue of the sequential operation of switches Ha and Hb of Fig. 4.

Figure 1:
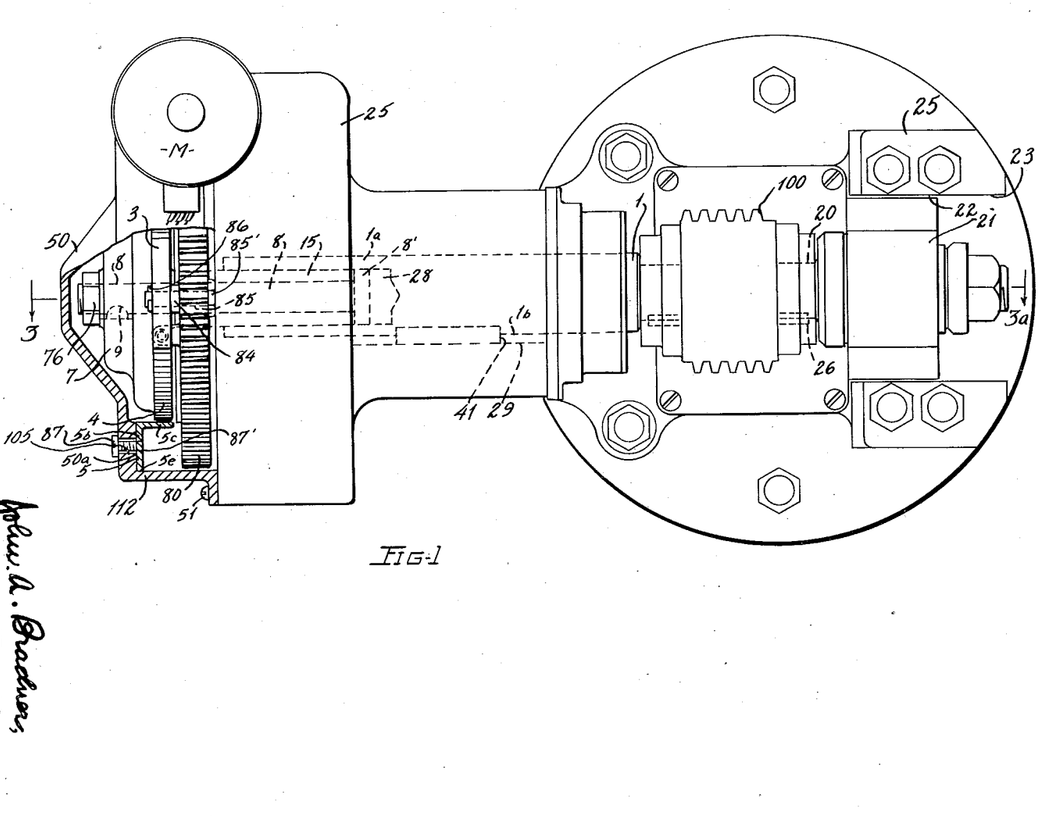
Fig. 1 is a plan view of the hob supporting head and associated parts for a gear hobbing machine which is an embodiment of my invention, portions of the head frame being indicated as broken away to expose inwardly disposed parts.

The following description of the operation of the apparatus of Figs. 1 to 3 inclusive, while making reference only to the switches C and D, and omitting reference to the other operative elements of the electrical circuit, will precede a more detailed description of the electrical circuit of Fig. 4.

With the pawl in a normal solid line position as indicated in Fig. 2 and its tooth 3' resting upon the shield flange 5', upon energization of the motor M, the worm gear transmission P—80 effects rotational movement of the worm gear which carried the pawl 3, to cause the pawl to ride over the trailing edge 5d of said shield flange to permit the pawl spring 16 to project the pawl tooth 3' into driving engagement between a predetermined adjacent pair of the ratchet teeth 4 of the wheel 7, as indicated by the dotted line showing of said pawl in Fig. 2.

Continued rotational movement of the gear will then cause said pawl to rotationally thrust the ratchet wheel 7 in the counter clockwise direction until rotational movement of the ratchet wheel is arrested by engagement of the cam element 203 with an actuating plunger 217, of a snap action electric switch C, which is thereby operated to effect reversed rotation of the motor shaft to cause the worm gear 80 to be reversely rotated to retract the pawl 3 to its initial solid line position of Fig. 2.

The pawl tooth 3' is then cammed upwardly by the inclined end surface 5d of the shield 5, to restore said pawl tooth to its original position with its tooth in spring-pressed engagement with the outer arcuate surface of the shield flange 5'. Such reversed rotational employment of the gear 80 and pawl 3 is terminated, responsive to reengagement of the gear carried cam 203 with the actuating plunger 207 of the snap-action stop switch D.

Upon initiation of the return clockwise movement of the gear 80, the cam extension 203 of the gear 80 permits the spring-pressed plunger actuator 217 of the switch C to be restored to its normal downwardly projected position. Both switches D and C are now restored to normal position, but even though the inoperative period of the hobbing machine will not have expired, such restoration of said two switches will not be effective to restart the motor M for the hob adjustment mechanism, this being prevented in the manner set forth in the later description of the electrical controlling apparatus and circuit.

The first functional purpose served by driving the ratchet wheel 7 in the recited counter-clockwise direction is to positively rotate the jam screw 8 by motion communicated from the wheel 7 through the key 9, in the proper direction as to sufficiently move its head 8' in a rearward direction as to release its threads from jamming engagement with the internal threads of the rear cylindrical portion of the spindle recess 28, which in turn will release the exterior threads of the sleeve 15, from jammed frictional engagement with the spindle threads, so that the sleeve 15 may be rotatably driven.

Meanwhile, the recited rotational movement of the wheel 7 has effected storing of retractive energy in the resilient spring 16, which acts as a resiliently yielding torque transmitting element interposed between the wheel 7 and the vane 13, which is keyed at 160 onto the sleeve 15, and the inertia of the unit comprising such vane and sleeve, supplemented by the very considerable frictional retardation of the sleeve which is in screw-threaded engagement at 15b with the hob spindle 1, prevents such torque from being effective to rotate the sleeve and vane unit. The accumulated effect of such torque effort, for a considerable portion of the period of counter-clockwise rotation by the ratchet wheel 7, is to resiliently distort the spring 16 so as to store potential energy therein.

However, when the ratchet wheel 7 has been rotated over an angle equal to the angle of divergence between the side 13a of the vane 13 and a lateral surface 7x of the wall 7c, said wall 7c, which is disposed in the plane of the vane edge 13a, will engage the surface of said vane edge, and as a result, during further counter-clockwise movement of the wheel 7, the vane 13 and the sleeve 15 will be positively rotated as a unit, responsive to the thrust exercised upon it by the wheel wall portions 7x of the inner recessed surface of the ratchet wheel.

From the above, it follows that the jam screw 8 first is released from jamming engagement with threads of the spindle recess 28 by rotation of the screw head 8' over an angle corresponding to the angle such as 20°, but which in any case is defined by the angular relation between the lines 7x and 13a of Fig. 2, and during rotation of said wheel 7 over such an angle of movement retractive potential energy is stored in the spring 16, which interconnects the wheel 7 and the vane and sleeve unit 13—15.

Thereafter during the continued counter-clockwise movement of the wheel 7, with the wheel recess shoulder walls 7x in engagement with the vane edges 13a, both the jam screw and the freed sleeve 15 are correspondingly rotated as a unit, but the sleeve flange 15a being interposed between front and rear abutments will prevent longitudinal movement of the sleeve, and therefore, the thrust effect of rotation of the threaded sleeve 15, whose threads are inter-threaded at 15b with the inner threaded walls of said spindle recess 28, will be to force the spindle in a forward direction an amount proportional to the extent of rotational movement of the vane 13, as predetermined by the adjustment of the shield 5, and also by the pitch of the threads 15b.

Such movement of the forward end of the spindle causes the spindle supporting block 21, which is affixed to the forward end of the spindle, to slide in the slideways 22 of the head frame 25, while the rear cylindrical and internally threaded end of the hob spindle will slide in said sleeve 29, the hob 100 on the arbor 20 being correspondingly longitudinally displaced an amount calculated to dispose some one of the succeeding hob teeth in the longitudinal position of a hob tooth whose position has been such as to cause its cutting edges the most wear.

Responsive to the reverse clockwise movement of the gear 80 and pawl 3, the pressure exerted thereby on the ratchet wheel 7 which, as previously stated, had stored retractive energy in the spring 16, there being no further restraint exercised upon the wheel 7, said spring, retracting, converts the potential energy previously stored therein into the kinetic energy of motion to retract the wheel 7 until the wheel recess shoulder 7x again becomes separated from the vane 13a, which remains stationary, being affixed to the relatively immovable sleeve 15, until further movement of the wheel is prevented by re-engagement of the wheel recess wall portions 13b with the relatively opposing lateral surfaces of the vane.

The condition of relative reengagement corresponds to that assumed by said vane and recessed shoulders prior to initial operation of the adjustment mechanism as a result of the above mentioned original activation of the motor.

The movement imparted by the retractive effort of the spring 16 to the wheel 7 is in the clockwise direction, as viewed in Fig. 2, and such rotational movement of the wheel 7 communicates rotative movement to the jam screw 8 and its head 8' in the proper direction to advance the head 8' of said screw to restore jamming engagement between the threads of the screw head and the threads of the spindle recess, and thus to jam the threads of said sleeve 15 longitudinally against lateral surfaces of the thereby engaged spindle threads to effectually prevent rotational movement of said sleeve during the ensuing period of operation of the hobbing machine.

All parts of the mechanism illustrated in Figs. 1 to 3, inclusive, are therefore restored to such positions as they normally assume during non-adjustment and work periods and wherein they are adapted for rotational driving of the hob by the gear train 40, 42, 46, 44, 43, and 45 shown in Fig. 3.

Although in the foregoing description the locking member 8 has been termed a jam screw, and the thrust element 15 has been termed a threaded sleeve, said locking member and said thrust element being shown and described as in successively superposed telescoped relation, with the outermost said element being telescoped within the rearmost internally threaded cylindrical recess of the spindle, it will be clear to those skilled in the present and ancillary arts that said locking member 8 and said thrust element 15, which is also in the form of a screw, may be otherwise formed and relatively disposed with respect to each other and with respect to the rearmost shank portion 1a of the spindle 1 to operate substantially in the manner as that described.

The electrical circuit and apparatus included therein, which is effective to start the motor M to longitudinally adjust the hob and subsequently to retract the gear 80 to its initial rotative position will now be described.

At H I indicate diagrammatically a portion of an element of the hobbing machine which carries a switch operating element HS, said element H being illustrated in a position which may be assumed during the period when the hobbing machine is operative and is engaged in cutting the teeth on a gear or other blank which the machine may, at the time, cut.

Automatic hobbing machines commonly sequentially and automatically successively cut the teeth on a plurality of such blanks and thereafter either automatically or by operation of a switch manually the operation of the machine is discontinued, the driving motors therefor being deenergized and the parts become restored to their respective inoperative positions.

An example of a hobbing machine to which the apparatus of my invention is adapted to be applied is disclosed in United States Patent No. 2,364,932 dated December 12, 1944 to Warner et al. The switches Ha and Hb and the element HS are herein assumed to represent any desired arrangement whereby the two switches Hb and Ha operated at any suitable interval subsequent to the operation of the switch Ha.

It will be understood that these two switches may be operated by entirely different elements of the hobbing machine rather than the single element H which herein is assumed to move downwardly to operate the said switches Ha and Hb.

The relays A, B, Fs and Rs are relays adapted to operate from the available source of current which herein is assumed to be an alternate current source, as indicated by the A. C. conductors 121 and 122. The relays Fs and Rs are preferably the usual relays commonly employed to be energized at different times to effect such switching connections in the motor M as will cause the motor to be driven in respectively forward and reverse directions. The set of switch blades N are those switch blades commonly associated with the magnets of Fs and Rs in a capacitor type motor and commonly instead of two sets of such blades only a single set is employed and is adapted to be operated in alternate directions at different times by the respective energization of the magnet Fs or Rs.

To these magnets, for the purpose of the present invention, a set of contacts 201 and 202 have been added to effect certain functions hereinafter described.

The switch D is that switch whose operating plunger 207 normally holds its contacts 206 in their relatively open position and the switch C is that shown uppermost in Fig. 2 and adapted to be operated when the cam 203, which is carried by the gear 80, reaches its dotted line position wherein said cam engages the plunger 2 which presses the switch blade of switch C from its position of engagement with the contact 204 and shifts it to the contact 205.

Assuming now that the hobbing machine has been shut down and the switch operating element HS progressively moves downwardly to successively cam the blades Ha and Hb outwardly, in such a case, the contacts of the switch Ha will be closed only momentarily but the operating element HS will come to rest in the dotted line position HS', and contacts of the switch Hb will remain closed so long as the hobbing machine remains inoperative with the switch operating element HS in its lowermost dotted line position HS'.

Initially, momentary operation of the switch Ha will energize the relay A by current supplied from the circuit conductor 121 through the switch contacts Ha, the winding of the relay A contacts 204 of the switch C to circuit conductor 122.

Energization of the relay A will effect closing of its two pairs of contacts 208 and 209, the set 208 affording a shunt across the contacts of the switch Ha to maintain the relay A closed after the switch contacts Ha are reopened.

The relay A remaining energized, the switch Hb being subsequently closed, the relay B will be energized over a circuit including the closed contacts of switch Hb to effect energization of the starting relay Fs, energizing current for the relay Fs being supplied through the respective contacts 209 and 210 of the relays A and B.

The switch blades N are therefore moved to their motor starting position and in such a direction as to so energize the motor M as to cause its shaft S to move the gear 80 in the counterclockwise direction, as viewed in Fig. 2.

The cam 203 which is rigidly affixed at 211 to said gear will thus carry the pawl 3, as previously described, in a counterclockwise direction, from the solid line showing of said pawl to the dotted line showing thereof, and as previously described, such movement of the pawl will rotate the ratchet wheel 7 to effect longitudinal adjustment of the hob.

The initial movement of the cam 203 will release the switch plunger 207 whereby the blade of switch D will resiliently restore engagement of said blade with the switch contact to close the contacts of said switch D. When the cam 203 reaches the dotted line position of Fig. 2, it will engage a similar plunger 217 for the switch C and said plunger will be cammed upwardly to move the switch blade of said switch C from its position wherein it was previously in engagement with the contact 204 and switch it to engagement with the alternate normally open contact 205.

Breaking of the contact 204 is effective to deenergize the relay A serially included in circuit with said contact 204 and the consequent breaking of the contacts 209 of relay A will interrupt the circuit of the starting relay Fs to discontinue said driving of the motor.

As such time, deenergization of the relay Fs will effect closing of the contacts 201 to complete a circuit including the now closed contacts 205 of the switch C for the relay Fs whereupon said relay Rs being energized, the motor energizing switch blades N will be shifted by the magnet of relay Rs from their previous position given them by energization of the relay Fs to the alternate position wherein the circuits of the capacitor motor are shifted to effect rotation of the motor shaft in the relatively reversed direction.

At the time the relay Fs is energized by closure of the contact set 205 of switch C, a pair of normally open contacts 202 are closed by said relay to provide a substitute energizing circuit for its winding, said circuit including the contacts 206 of the relay D and contacts 202 of the relay Rs, and which substitute circuit is in shunt relation to the initial energized circuit comprising the contacts 205 of switch C and 201 of switch Fs.

The motor therefore will be reversely driven to drive the gear 80 in the reversed clockwise direction to restore the pawl 3 to its original solid line position of Fig. 2 and at the same time to move the cam 203 from engagement of the plunger of the switch C to its original position of engagement with the plunger 207 of the switch D to break the contacts 206 in the substituted locking circuit comprising contacts 202 for the relay Rs, the contacts 205 of switch D having been first opened, breaking of said substitute locking circuit effects deenergization of the relay Rs whereupon the reversed energization of the motor is discontinued and all parts are restored to the positions shown in Fig. 4 with the single exception that until the hobbing machine is again started the contacts of the switch remain closed and consequently the relay B maintains its contacts closed but without any effect upon the operative elements of the apparatus of Fig. 2 which remains quiescent.

Subsequently, the hobbing machine engaged upon another operating period, the switch actuator Hs will be moved away from engagement with the blade of switch Hb and beyond its engagement with the switch Ha.

This operation will relock the relay A without other effect than to precondition the electrical system for another cycle when, after the hobbing machine is shut down, the switch Hb becomes operated to close its contacts, the operation thereafter being as before described.

Although I have illustrated and described the hob adjusting apparatus as operated by a reversible motor, however, I am well aware that the motor need not be reversible, obvious alternatives being the provision of a reversing gear-shifting mechanism between the shaft of a unidirectional motor and the driving gear P, or other means for retracting the advanced wheel 7 or gear 80, such as a spring, and, in any case, the motor need not be of the electric type but may be a spring pneumatic, hydraulic, or any other type of motor commonly known to be applicable to the driving of the adjustment mechanism.

Again, the expedient of the toothed wheel or of the particular form of lost motion transmission comprising the vane 13 while now preferred by many are likewise subject to substitution by other alternative mechanical movements, but all such alternatives are within the scope of my invention broadly considered, it being my object to here show an embodiment employing instrumentalities which I believe best adapted to the carrying out in an expeditious manner the objects of my invention, and having described my invention in a particular embodiment and employing specific instrumentalities, I am aware that numerous and extensive departures may be made from said embodiment and instrumentalities but without departing from the spirit of my invention.

I claim:

1. The combination with a periodically actuatable motor-driven hobbing machine comprising a driving motor, a longitudinally adjustable arbor, a hob carried by said arbor, thrust means adapted, when actuated, to exert a longitudinal adjustment effort upon said arbor, of locking means normally adapted to hold the arbor against longitudinal movement in either direction, motor means, means automatically operable responsive to periodic stopping of said machine to effect activation of said motor means, transmission means adapted to transmit movements communicated from said motor in sequence to said locking means and to said thrust means to sequentially disable said locking means to free said arbor for longitudinal adjustment and to progressively shift the longitudinal position of said freed arbor, and means automatically operable responsive to a predetermined degree of arbor shifting movement to restore said locking means to effect re-locking of said arbor, and to disable said motor.

2. The combination with a periodically actuatable motor-driven hobbing machine comprising a longitudinally adjusted hob spindle, said spindle having a portion carrying screw threads, an adjustable rotatable threaded thrust screw interthreaded with, and in relatively telescoped relation with, the threaded spindle portion, abutment means for preventing longitudinal movement of said screw, a rotatable locking member normally rotated to a locking position to rigidly interlock said screw and said spindle to prevent relative rotation of said screw and spindle, a motor, a shaft therefor, transmission means adapted to effect successive rotational driving of said locking member and said screw, said transmission means comprising a lost-motion mechanism whereby motion is first communicated to said locking member to rotate it sufficiently to relatively unlock said screw and said spindle, and said mechanism adapted when said screw and spindle are unlocked to communicate rotary motion from said wheel to said screw to effect a longitudinal movement of said spindle by the longitudinal thrust effected by the threads of the rotating screw against the relatively engaged threads of said spindle, and limit means operable responsive to completion of driving of said screw by said motor through said transmission means to such an extent as to adjustably advance said spindle a predetermined amount to discontinue spindle adjustment movement of said screw, and to restore said locking member to normal interlocking relation with said spindle and said screw.

3. The combination substantially as set forth in claim 2, characterized by the provision of a worm pinion on said motor shaft, a worm gear adapted to be driven by said pinion, a ratchet wheel, a pawl journaled on said gear adapted for driving engagement with said wheel, and said locking member secured to said wheel and rotatable therewith, and said lost-motion means comprising normally interspaced wheel and screw portions adapted for inter-engagement, responsive to completion of a first portion of the rotative movement of said wheel, to communicate a rotary thrust torque from said wheel to said screw to adjust said spindle.

4. The combination substantially as set forth in claim 2, characterized by the said transmission means comprising reduction gearing interposed between said motor shaft and said locking means to effect relatively slow speed rotary movement of said lost-motion mechanism being interposed between a slow-motion rotatable element of said gearing and said screw and comprising a pair of normally interspaced parts of said rotatable element and said screw and said parts adapted to make abutting engagement upon the completion of a predetermined portion of the rotary movement of said element, to effect driving of said screw.

5. The combination substantially as set forth in claim 2, as characterized by said locking member, being in the form of a rod disposed co-axially with said screw and said threaded spindle portion, and having a portion formed to provide screw threads disposed in meshed relation with a portion of said spindle threads, said spindle thread portion being disposed longitudinally of the portion of said spindle threads engaged by the thrust screw threads at any same time.

6. The combination substantially as set forth in claim 2, characterized by the provision of a worm pinion on said motor shaft, a worm gear adapted to be driven by said pinion, a ratchet wheel, a pawl journaled on said gear adapted for driving engagement with said wheel, and said locking member secured to said wheel and rotatable therewith, and said lost-motion means comprising normally interspaced wheel and screw portions adapted for inter-engagement, responsive to completion of a first portion of the rotative movement of said wheel, to communicate a rotary thrust torque from said wheel to said screw to adjust said spindle, an arcuate shield adapted to maintain a stationary position close to but radially spaced outwardly from an arcuate peripheral portion of said ratchet wheel, and said pawl in its initial normal position being disposed radially outwardly of said shield and with its tooth in spring-pressed engagement with the outer surface of the shield, being thereby restrained from engagement with the outer surface of said wheel, and said pawl adapted, responsive to arcuate movement imposed thereupon by rotation of said gear, to override a forwardly disposed edge of said shield to effect engagement of said pawl with the teeth of said wheel at a predetermined portion of the periphery of said wheel, and means adapting said shield to be arcuately shifted to predeterminedly vary the circumferential position of engagement of said wheel teeth by said pawl tooth.

7. In a hobbing machine, the combination of relatively longitudinally interthreaded hob spindle and spindle adjusting shaft elements, means to prevent longitudinal movement of said shaft element, a threaded jam locking member in interthreaded relation with one of said elements and normally adapted, responsive to precedent slight rotational movement relative to said element, to exert a relatively longitudinally directed thrust effort, of the threads of one of said elements against the threads of the other element, and of its own threads against the threads of the element interengaged therewith, to lock said elements against relative rotation, adjustment means for longitudinally adjusting said spindle, adapted, when rotated in continuous predetermined direction, to initially slightly rotate said member in the unlocking direction sufficiently to relieve all said inter-engaged threads from relative jamming longitudinal pressure, and comprising transmission means adapted to transmit a subsequent portion of said rotative movement of said rotatable means to said shaft element to rotate the same, the threads of said shaft element and said jam locking member corresponding in pitch and direction, whereby, during said continued rotational movement of said adjustment means the said locking member and the said shaft element are caused to be rotated as a unit, and the relatively inter-engaged threads of said elements being adapted to convert the recited rotary movement of the shaft element into longitudinal adjustment movement of the spindle element.

8. In a hobbing machine, the combination of relatively longitudinally inter-threaded spindle and spindle adjusting shaft elements, means normally restraining longitudinal movement of the shaft element, a rotatable locking member for normally restraining relative rotation of said shaft element relative to said spindle element, said locking member adapted to be slightly rotated in one direction to effect said locking, and in the other direction to free said shaft element for relative rotation with respect to said spindle element, and a rotatable adjustment means adapted, when continuously rotated in the same direction, to sufficiently rotate said locking member as to relatively unlock said elements, and adapted upon continued movement in the same direction to rotate said shaft element with said locking member and with respect to said spindle element, to impose a longitudinal adjustment movement on said spindle element, with the extent of said longitudinal spindle movement being proportional to the extent of said continued portion of the said rotational movement of said adjustment means.

9. In a hobbing machine, the combination substantially as set forth in claim 8, characterized by the provision of motor means for driving said adjustment means, and automatic stop means operable upon a predetermined rotational movement of said adjustment means to interrupt driving of said adjustment means by said motor means.

10. In a hobbing machine, the combination substantially as set forth in claim 7, characterized by said adjustment means, said locking means, and said elements being disposed in coaxial relation and said adjustment means being unitarily rotatable with said locking means, and transmission means for said shaft element, comprising means disposed in the rotative path of means rotatable with said adjustment means, but normally interspaced therefrom.

11. In a hobbing machine, the combination with relatively interthreaded hob spindle and hob thrust shaft elements, a locking member alternately rotatable in opposite directions over a slight angle to prevent or to permit relative rotational movement of said thrust element with respect to said single element, an adjustment device to longitudinally adjust the spindle element in a given longitudinal direction, said adjustment device adapted to be rotated in a given direction over a predetermined angle greater than said first named angle, said device operative when so rotated to rotate said locking means in such direction as to move it from a normal locking rotative position to an unlocking position while said shaft element remains stationary, and an abutment for said shaft element positioned in the rotative path of an element of said adjustment device, to adjustably rotate said shaft element over an angle equal to the angular difference between the above recited angles.

12. The combination of a hobbing machine and the hob spindle thereof, said spindle having relatively longitudinally disposed portions respectively affording a hob arbor and a longitudinally threaded portion, a longitudinally immovable adjustment element having a threaded portion interthreaded with the threaded spindle portion, a locking element adapted upon rotative movement, in one direction to relatively interlock said spindle and said adjustment element against relative rotative movements, and adapted upon rotative movement in the opposite direction to relatively unlock the same, said adjustment element adapted when rotated to cause its threads to effect a longitudinal adjustment movement of the spindle, and a common rotatable member adapted when rotated in a single direction of rotation, to first rotate said locking element in the direction for relatively unlocking said threaded spindle portion and said adjustment element, and then to rotate said adjustment element relative to said spindle to adjustably longitudinally shift said spindle.

13. The mechanism substantially as set forth in claim 12, characterized by the provision of means automatically activated responsive to the termination of an adjustment movement of said adjustment element, adapted to rotate said locking element in the locking direction to relatively relock said spindle and adjustment against relative rotation.

14. The combination with a periodically actuatable motor-driven hobbing machine comprising a longitudinally adjusted hob spindle, said spindle having a portion carrying screw threads, an adjustable rotatable threaded thrust screw interthreaded with, and in relatively telescoped relation with, the threaded spindle portion, abutment means for prevention of longitudinal movement of said screw, a rotatable locking member normally rotated to a locking position to rigidly interlock said screw and said spindle to prevent relative rotation of said screw and spindle, a motor, a shaft therefor, transmission means adapted to be driven by said motor when started to effect successive rotational driving of said locking member and said screw, said transmission means comprising a lost-motion mechanism whereby motion is first communicated by said motor to said locking member to rotate it sufficiently to relatively unlock said screw and said spindle, and said mechanism adapted after said screw and spindle are relatively unlocked to communicate rotary motion from said motor to said screw to effect a longitudinal movement of said spindle by the longitudinal thrust effected by the threads of the rotating screw against the relatively engaged threads of said spindle, and limit means operable responsive to a preedtermined degree of driving of said screw by said motor through said transmission means as to effect a predetermined amount of re-adjustment advancing movement of said spindle, adapted to effect discontinuance of said spindle adjusting movement of said screw, and adapted to therefore restore said locking member to normal interlocking relation with said spindle and said screw.

JOHN A. BRADNER.

REFERENCES CITED

The following references are of record in the file of this patent:

UNITED STATES PATENTS

| Number | Name | Date |
| --- | --- | --- |
| 2,210,134 | Staples | Aug. 6, 1940 |